US007845177B2

(12) United States Patent
Parsons

(10) Patent No.: US 7,845,177 B2
(45) Date of Patent: Dec. 7, 2010

(54) METERING DEMAND FUEL SYSTEM

(75) Inventor: Douglas A. Parsons, Canton, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 949 days.

(21) Appl. No.: 11/681,284

(22) Filed: Mar. 2, 2007
(Under 37 CFR 1.47)

(65) Prior Publication Data
US 2008/0028742 A1 Feb. 7, 2008

Related U.S. Application Data

(63) Continuation-in-part of application No. 10/942,206, filed on Sep. 16, 2004, now Pat. No. 7,216,487.

(51) Int. Cl.
*F02C 9/00* (2006.01)
(52) U.S. Cl. .................. 60/773; 60/39.281; 60/734
(58) Field of Classification Search ............... 60/776, 60/772, 773, 39.281, 734; 417/2, 53, 201, 417/426, 428
See application file for complete search history.

(56) References Cited

U.S. PATENT DOCUMENTS

| 3,908,360 A | 9/1975 | Meyer et al. |
| 3,946,551 A | 3/1976 | Linebrink et al. |
| 4,208,871 A | 6/1980 | Riple, Jr. |
| 4,332,527 A | 6/1982 | Moldovan et al. |
| 4,607,486 A | 8/1986 | Cole |
| 4,864,815 A * | 9/1989 | Cygnor ................. 60/786 |
| 5,116,362 A | 5/1992 | Arline et al. |
| 5,220,793 A | 6/1993 | McGlone et al. |

(Continued)

FOREIGN PATENT DOCUMENTS

GB 652321 4/1951

(Continued)

OTHER PUBLICATIONS

European Search Report, Feb. 15, 2006.

(Continued)

*Primary Examiner*—Michael Cuff
*Assistant Examiner*—Craig Kim
(74) *Attorney, Agent, or Firm*—Carlson, Gaskey & Olds, P.C.

(57) ABSTRACT

A fuel system includes first and second drive assemblies that are independently drivable relative to one another. The second drive assembly has a speed that is selectively controlled based upon a desired fuel flow. A non-positive displacement pump is driven by the first drive assembly. The non-positive displacement pump provides a desired fuel pressure for the fuel system. A positive displacement pump is driven by the second drive assembly. The positive displacement pump meters a desired volume in response to the speed of the second drive assembly in a first rotational direction. The fuel flows from the pumps and passes through a bypass valve that acts as a minimum pressure shut-off valve. During shut-down of the first drive assembly, the bypass valve is opened by a solenoid and the rotational direction of the second drive assembly is reversed to a second rotational direction to evacuate fuel from the system with the positive displacement pump and return the fuel to the fuel tank.

17 Claims, 1 Drawing Sheet

U.S. PATENT DOCUMENTS

| | | | |
|---|---|---|---|
| 5,495,715 A * | 3/1996 | Loxley | 60/734 |
| 6,353,790 B1 | 3/2002 | Tsuzuki | |
| 6,675,570 B2 | 1/2004 | Herbison et al. | |
| 7,080,507 B2 | 7/2006 | Katogi et al. | |
| 7,216,487 B2 | 5/2007 | Parsons | |
| 2001/0054290 A1 | 12/2001 | Herbison et al. | |

FOREIGN PATENT DOCUMENTS

| | | |
|---|---|---|
| JP | 2-26736 | 2/1990 |
| JP | 04-325724 | 11/1992 |
| JP | 2004-225539 | 8/2004 |
| JP | 2005-351196 | 12/2005 |
| JP | 2006-83864 | 3/2006 |

OTHER PUBLICATIONS

Office Action for Japanese Application No. 2008-51601, Jun. 1, 2010.

* cited by examiner

METERING DEMAND FUEL SYSTEM

The application is a Continuation-In-Part which claims the benefit of U.S. patent application Ser. No. 10/942,206 filed Sep. 16, 2004 now U.S. Pat. No. 7,216,487.

BACKGROUND OF THE INVENTION

This invention relates to a fuel system for delivering fuel to gas turbine engines.

Prior art fuel systems include a large positive displacement pump driven by a turbine engine through a gearbox. To achieve the desired fuel volumes and pressures for the demands of the turbine engine, the positive displacement pump is specifically oversized for peak demand. As a result, the fuel system utilizes a bypass valve to return the unneeded fuel back to tank, which is greatly inefficient. Moreover, the returned fuel is hot, which undesirably raises the temperature of the fuel within the fuel tank. Excess pressure that is generated must be relieved using a pressure regulator to mitigate any potential burst or over pressure conditions.

Prior art fuel systems employ precision metering valves to regulate the flow rate through the fuel system to meet the turbine engine fuel demand. The metering valves have tight tolerances and any contamination present within the fuel system comprises the operation of the valves.

Utilizing an electric motor instead of the turbine engine to drive the positive displacement pump to meet a turbine engine fuel demand is not practical. In one example, an 80 horsepower motor weighing over 100 pounds would be necessary to supply the needed fuel to the turbine engine, which is not acceptable within the industry.

Another problem with prior art fuel systems is a phenomena known as "coking." A fuel manifold distributes fuel to multiple nozzles associated with the turbine engine. During shutdown, residual fuel in the fuel manifold can drain into the lower nozzles and burner system and form carbon build up or coke. Coking results in reduced burner efficiency, nozzle flow irregularities, combustion instability and excessive emissions as un-combusted fuel is vaporized. To address this problem, fuel storage canisters have been used that rely on complicated timing valves and turbine burner pressure, which is considered unreliable.

What is needed is a fuel system that reduces coking while eliminating the need for expensive, high accuracy fuel metering valves and/or reduces excess pressure and flow within the fuel system.

SUMMARY OF THE INVENTION

One possible embodiment of the present invention provides a fuel system including first and second drive assemblies that are independently drivable relative to one another. In one example, the first drive assembly is a turbine engine, and the second drive assembly is an electric motor. The second drive assembly has a speed that is selectively controlled based upon a desired fuel flow.

A non-positive displacement pump, such as a centrifugal pump, is driven by the first drive assembly. The centrifugal pump provides a desired fuel pressure for the fuel system. A positive displacement pump is driven by the second drive assembly. The positive displacement pump is in fluid communication with the centrifugal pump, for example in a series arrangement. The positive displacement pump meters a desired volume in response to the speed of the second drive assembly.

The positive displacement pump may be arranged before or after the centrifugal pump, and more than one centrifugal pump may be used.

In operation, a desired fuel flow is requested based upon the fuel flow demanded by the turbine engine. A controller commands the first drive assembly to rotate the positive displacement pump at a speed providing a fuel volume that sufficiently satisfies that desired fuel flow. The centrifugal pump is driven by the turbine engine independently of the positive displacement pump. The centrifugal pump produces a desired fuel pressure for the fuel volume.

Fuel flows from the pumps and passes through a bypass valve, which acts as a minimum pressure shut-off valve. During engine shut-down, the bypass valve is opened by a solenoid and the rotational direction of the electric motor is reversed to evacuate fuel from the system with the positive displacement pump and return the fuel to the fuel tank.

Accordingly, the present invention provides a fuel system with reduced coking that eliminates the need for expensive, high accuracy fuel metering valves and/or reduces access pressure and flow within the fuel system.

These and other features of the present invention can be best understood from the following specification and drawings, the following of which is a brief description.

DETAILED DESCRIPTION OF THE PREFERRED EMBODIMENT

Figure 1:
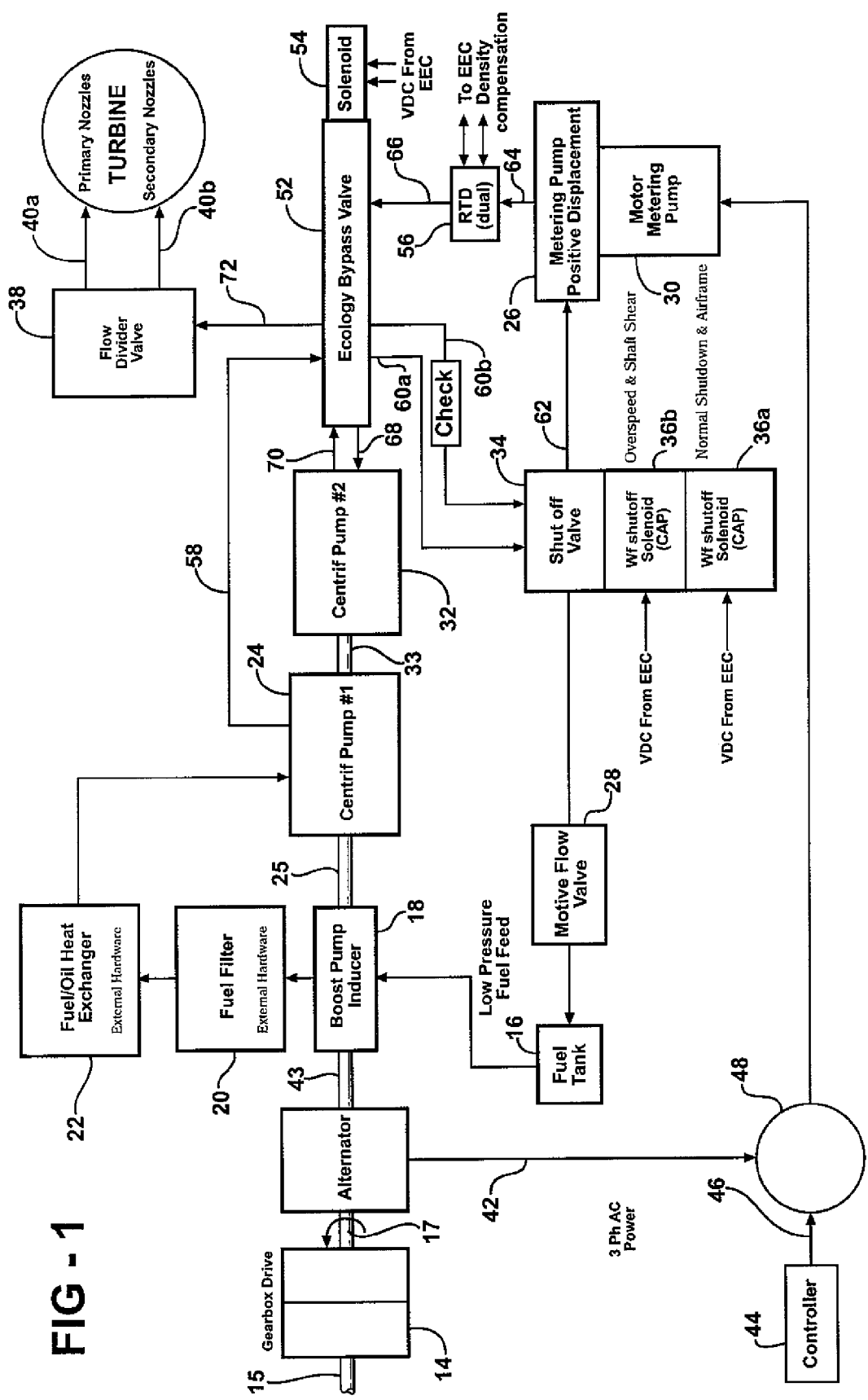
FIG. 1 is a schematic view of an example fuel system having centrifugal and positive displacement pumps with the inventive ecology feature.

A schematic of one example of an inventive fuel system 10 is shown in FIG. 1. The fuel system 10 includes a turbine engine 12 that receives fuel from a fuel tank 16. A gearbox 14 is used to drive various components of the fuel system 10 and may be mounted on the turbine engine 12 such that gearbox 14 receives rotational input from the turbine engine 12 through shaft 15.

The fuel system 10 only illustrates portions of an example fuel system for clarity. The components depicted should in no way be interpreted as limiting the inventive pump arrangement. The example fuel system 10 shown may be suitable for small engine applications such as those used for business jets. Large engine and other small engine applications may have different or additional components.

The gearbox 14 drives a boost pump inducer 18 through a shaft 43. The boost pump inducer 18 draws fuel from the fuel tank 16 and delivers the fuel to a fuel filter 20 and heat exchanger 22, which removes heat from the fuel. The filtered, cooled fuel is provided to a first non-positive displacement pump.

The first non-positive displacement pump, such as a centrifugal pump 24, is driven by a shaft 25. Fuel from the centrifugal pump 24 is provided to a positive displacement pump 26 through a first passage 58 to an ecology bypass valve 52, which acts as a minimum pressure shut-off valve, which pressurizes the fuel within the fuel tank 16. Before reaching the positive displacement pump 24, the fuel passes through second passages 60a and 60b to a shut-off valve 34 controlled by solenoids. A shut-off solenoid 36a is operable to stop the flow of fuel to the turbine engine 12 during shut down procedures initiated by the pilot, for example. Another shut-off solenoid 36b stops the flow of fuel to the engine turbine 12 during over speed conditions, for example. The valves 36a and 36b are known in the art.

From the shut-off valve 34, fuel flows through third passage 62 to the positive displacement pump 26. Any fuel not pumped by the positive displacement pump 26 returns to the tank 16 through a motive flow valve 28.

The positive displacement pump 26 is driven by an electric motor 30 in a first direction to provide fuel to the turbine engine 12. The electric motor 30 is independently operable relative to the gearbox 14 and turbine engine 12. In one example, the electric motor 30 is three horsepower and weighs approximately fifteen pounds. The positive displacement pump 26 provides a constant volume of liquid for a given speed regardless of the pressure to which the positive displacement pump 26 is exposed. The positive displacement pump 26 meters the amount of fuel delivered to the turbine engine 12 and provides a desired fuel volume. The volume of fuel through the positive displacement pump 26 is varied by varying the speed of the electric motor 30 eliminating the need for fuel metering valve.

Metered fuel from the positive displacement pump 26 flows through a fourth passage 64 to a resistance temperature detector (RTD) 56 that is used to compensate for the changes of density in the fuel due to temperature fluctuations. The fuel is provided to the bypass valve 52 from the RTD 56 through a fifth passage 66. Fuel is sent to a second non-positive displacement pump 32 through a sixth passage 68 and returned again to the bypass valve 52 through a seventh passage 70.

A second non-positive displacement pump, such as a centrifugal pump 32, is driven by a shaft 33. The centrifugal pumps 24 and 32 provide the pressure needed to deliver fuel through the turbine engine 12 in a desired manner. In one example, the pressure of the fuel at the inlet to the centrifugal pump 32 is between 60-110 psi. The centrifugal pump 32 raises the pressure of the fuel to approximately 1100-1200 psi at the outlet of the centrifugal pump 32.

The fuel is delivered to the turbine engine 12 from the bypass valve 52 through an eighth passage 72 to a flow divider 38 that sends the fuel through primary and secondary nozzles 40a and 40b, as is well known in the art. At engine shut down, it is desirable to remove the fuel in the area of the nozzles to prevent coking.

The bypass valve 52 moves from a closed position to an open position once the fuel pressure reaches a predetermined pressure. In the open position, the pumps 24, 26 and 32 and flow divider 38 are fluidly connected to one another. The bypass valve 52 automatically closes once the pressure falls below the predetermined pressure to stop the flow of fuel to nozzles. However, this is not enough to prevent coking since fuel still remains in the turbine engine 12.

When a shut down sequence is initiated, the fuel pressure drops and the bypass valve 52 moves from the open position to the closed position. A controller 44 commands an actuator, such as solenoid 54, to open the bypass valve 52. The connections between the controller 44 and the various components are not shown for clarity. The controller may be one or more devices. The controller 44 commands the electric motor 30 to reverse rotation to a second rotational direction to reverse the positive displacement pump 26. The positive displacement pump 26 quickly evacuates the fuel from the nozzles, flow divider 38, pumps 24, and passages 58, 60a and 60b, 62, 64, 66, 68, 70 and 72. The fuel is returned to the tank 16 through an open shut off valve 34, which may be subsequently closed.

An alternator 45 is driven by the gearbox 14 through shaft 17 along with the boost pump inducer 18 and centrifugal pumps 24 and 32 through a shaft 43. The inventive arrangement of centrifugal pumps 24 and 32 enables the centrifugal pumps 24 and 32 and alternator 45 to be driven at the same rotational speed. In the prior art, a separate gear pad was provided on the gearbox 14 to drive the positive displacement pump at a different speed than the alternator. The alternator 45 generates power 42 that may be used to drive the electric motor 30. A switching device or relay 48 selectively provides the power from the alternator 45 to the electric motor 30 in response to a speed command 46 from the controller 44 to vary the speed of the electric motor 30 based upon a desired volume of fuel. The fuel speed of the electric motor 30 can be controlled much more accurately than control of the prior art fuel metering valves.

The positive displacement pump is sized to provide a sufficient volume of fuel for a turbine engine start-up condition. That is, the flow rate curve of the positive displacement pump 26 is selected to match the needed volume of fuel for the turbine engine 12 during start-up. The centrifugal pump 32 is selected so that the head curve of the centrifugal pump 32 matches the backpressure curve of the turbine engine. In this manner, excess pressure will not be generated by the centrifugal pump 32 eliminating the need for a high pressure relief valve and minimizing any potential issues related to burst or over pressure conditions.

FIG. 1 schematically depicts the positive displacement pump arranged in series between the centrifugal pumps 24 and 32. Other suitable pump arrangements may be used. In one example, one centrifugal pump can be eliminated such that the positive displacement pump 26 is fluidly connected downstream of the centrifugal pump 24 in series. In another example, the centrifugal pump 24 can be arranged downstream of the positive displacement pump 26.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A fuel system comprising:
   first and second drive assemblies independently drivable relative to one another, the second drive assembly having a speed selectively controlled based upon a desired fuel flow;
   a first non-positive displacement pump;
   a second non-positive displacement pump driven by the first drive assembly, the second non-positive displacement pump configured to receive fuel from the first non-positive displacement pump and provide a desired fuel pressure; and
   a positive displacement pump driven by the second drive assembly in first and second rotational directions, the positive displacement pump in fluid communication with the first non-positive displacement pump, the positive displacement pump metering a desired volume in response to the speed in a first direction and evacuating fuel in the second direction.

2. The fuel system according to claim 1, wherein the first and second non-positive displacement pumps are each a centrifugal pump.

3. The fuel system according to claim 2, wherein the first drive assembly includes a turbine engine, and the second drive assembly includes an electric motor.

4. The fuel system according to claim 3, comprising an alternator driven by the turbine engine at a second speed, the centrifugal pumps driven by the turbine engine at the second speed with the alternator.

5. The fuel system according to claim 3, comprising a controller, wherein the pumps provide fuel to the turbine engine, and the controller determines a fuel demand for the turbine engine and provides a speed command to the electric motor corresponding to the desired fuel flow for satisfying the fuel demand.

6. The fuel system according to claim 1, wherein the first non-positive displacement pump and the positive displacement pump are fluidly connected in series with one another along a first fluid path, and the first and second non-positive displacement pumps are fluidly connected in series with one another along a second fluid path, the first and second fluid paths intersecting at a bypass valve.

7. The fuel system according to claim 6, comprising:
a fuel delivery device;
the bypass valve is fluidly arranged between the second non-positive and positive displacement pumps and fuel delivery device for selectively controlling the flow of fuel through the bypass valve, the bypass valve having open and closed positions, the bypass valve moving from the closed position to the open position in response to a predetermined fuel pressure and returning to the closed position at a low fuel pressure less than the predetermined fuel pressure; and
an actuator moving the bypass valve from the closed position to the open position with the positive displacement pump operating in a second direction to evacuate fuel from the fuel delivery device.

8. The fuel system according to claim 7, wherein the pumps and fuel device fluidly connected to one another via the bypass valve in the open position.

9. The fuel system according to claim 7, wherein the controller commands the electric motor to rotate in the second direction and the actuator to move the bypass valve from the closed position to the open position in response to an engine shut-down signal.

10. The fuel system according to claim 7, wherein the actuator is a solenoid.

11. A method of regulating the flow of fuel through a fuel system comprising the steps of:
a) providing fuel to an engine through an open bypass valve;
b) initiating an engine shut-down command;
c) closing the bypass valve upon reaching a predetermined fuel pressure;
d) actuating the bypass valve to an open position;
e) reversing a rotational direction of a pump to evacuate fuel through the bypass valve, wherein steps d) and e) are performed in response to performing step b).

12. The method according to claim 11, wherein step a) includes driving the pump with an electric motor during an engine start-up.

13. The method according to claim 11, wherein step a) includes pumping fuel through the bypass valve with a first pump and delivering the fuel to a second pump, the second pump pumping fuel through the bypass valve to a third pump, the third pump pumping fuel through the bypass valve to a fuel delivery device.

14. The method according to claim 13, wherein the first and third pumps are centrifugal pumps, and the second pump is a positive displacement pump.

15. The method according to claim 13, wherein the fuel delivery device is a flow divider valve.

16. The method according to claim 11, wherein step a) is performed through a first fluid path, and step e) is performed through a second fluid path that is separate from the first fluid path.

17. The fuel system according to claim 6, a fuel tank fluidly connected to the first non-positive displacement pump via the first fluid path, and fluidly connected to the positive displacement pump via a return flow path, the second fluid path and return flow path intersecting at a shut-off valve, the shut-off valve in an open position with the positive displacement pump in the second direction and in a closed position with the positive displacement pump in the first direction.

* * * * *